United States Patent [19]
Fujieda

[11] Patent Number: 5,307,141
[45] Date of Patent: Apr. 26, 1994

[54] REFRACTIVE CHARACTERISTICS MEASURING APPARATUS FOR MEASURING THE REFRACTIVE CHARACTERISTICS OF A LENS

[75] Inventor: Masano Fujieda, Aichi, Japan

[73] Assignee: Nidek Co., Ltd., Aichi, Japan

[21] Appl. No.: 980,292

[22] Filed: Nov. 23, 1992

[30] Foreign Application Priority Data

Nov. 30, 1991 [JP] Japan .................. 3-342186

[51] Int. Cl.$^5$ .................................. G01B 9/00
[52] U.S. Cl. ................................... 356/124
[58] Field of Search .......... 356/124, 125, 127; 351/237≅239, 243

[56] References Cited

U.S. PATENT DOCUMENTS

| | | | |
|---|---|---|---|
| 4,730,924 | 3/1988 | Allard | 356/124 |
| 4,861,156 | 8/1989 | Terry | 351/243 |
| 5,121,981 | 6/1992 | Waltuck et al. | 351/243 |
| 5,173,729 | 12/1992 | Kurachi et al. | 356/124 |

FOREIGN PATENT DOCUMENTS 60-17335 (A) 1/1985 Japan .

*Primary Examiner*—F. L. Evans
*Attorney, Agent, or Firm*—Finnegan, Henderson, Farabow, Garrett & Dunner

[57] ABSTRACT

A refractive characteristics measuring apparatus enables the measurement of the refractive characteristics of a progressive multifocal lens through the observation of a geometrical test pattern through the lens. The apparatus comprises selector switches for selecting a desired geometrical test pattern, modifying the geometrical test pattern and moving the geometrical test pattern, a pattern generator for generating data representing the selected geometrical test pattern, a display for displaying the selected geometrical test pattern, and supporting members for supporting the lens on the display. The geometrical test pattern displayed on the display is observed through the lens to determine the respective positions of the far viewing section and near viewing section of the progressive multifocal lens through the observation of the geometrical test pattern distorted according to the distribution of refractive power in the progressive multifocal lens.

8 Claims, 5 Drawing Sheets

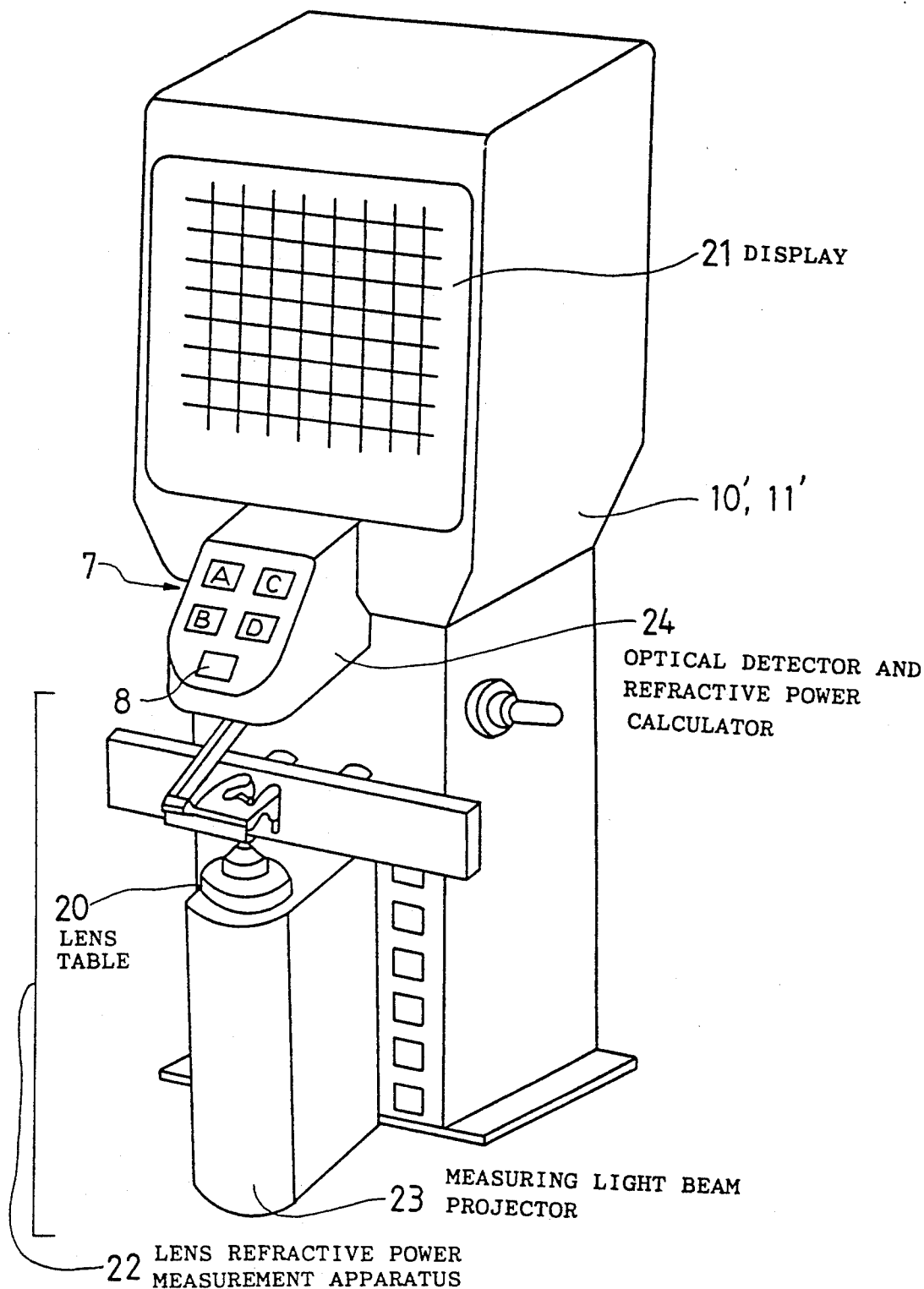

REFRACTIVE CHARACTERISTICS MEASURING APPARATUS FOR MEASURING THE REFRACTIVE CHARACTERISTICS OF A LENS

BACKGROUND OF THE INVENTION

1. Field of the Invention

The present invention relates to a refractive characteristics measuring apparatus for measuring the refractive characteristics of a lens to determine the distribution of refractive power in the lens and, more particularly, to a refractive characteristics measuring apparatus for determining the respective positions of the far viewing section and near viewing section of a progressive multifocal lens through the measurement and observation of the distribution of refractive power in the progressive multifocal lens.

2. Description of Related Art

The refractive power of a progressive multifocal lens, which has become prevalent in recent years, varies continuously from a far viewing section through a progressively varying focus area to a near viewing section. The progressive multifocal lens is similar in appearance to a single-focus lens and it is impossible to discriminate between the far viewing section and near viewing section of the progressive multifocal lens from the appearance of the same.

Therefore, the far viewing section and near viewing section of a progressive multifocal lens as manufactured, such as a progressive multifocal lens as shipped from the lens maker, are indicated by marks and dimensions of the respective positions of the far viewing section and the near viewing section, which differ between progressive multifocal lenses of different types. The respective positions of the far viewing section and the near viewing section are determined by measuring the progressive multifocal lens with reference to concealed marks indicating reference points and additive diopter or by placing the progressive multifocal lens on a layout chart showing the far viewing section and the near viewing section and printed on a sheet of paper. The respective refractive powers of the far viewing section and the near viewing section are measured individually by a lens meter.

However, it is difficult and requires much time to determine the respective positions of the far viewing section and near viewing section of the progressive multifocal lens by measuring the progressive multifocal lens after the progressive multifocal lens has been shaped and framed. Furthermore, there have been no effective optical measures for detecting errors in the specified positions of the far viewing section and the near viewing section and it is possible that the respective positions of the far viewing section and near viewing section are determined erroneously by measurement.

SUMMARY OF THE INVENTION

Accordingly, it is an object of the present invention to provide a refractive characteristics measuring apparatus for measuring the refractive characteristics of a progressive multifocal lens, capable of readily determining the respective positions of the far viewing section and near viewing section of the progressive multifocal lens through the observation of the distribution of refractive power in the progressive multifocal lens.

To achieve the objects and in accordance with the purpose of the invention, as embodied and broadly described herein, the refractive characteristics measuring apparatus for measuring the refractive characteristics of a lens of this invention comprises selector switches including a pattern selector switch to be operated for selecting a geometrical test pattern, to be used for the observation of the distribution of refractive power, from among a plurality of geometrical test patterns, a pattern generating means for generating data representing a geometrical test pattern selected by operating the pattern selector switch and storing the same in a memory, a display means for displaying the selected geometrical test pattern represented by the data generated by the pattern generating means and a support means for supporting the lens on the display means for the observation of the distribution of refractive power in the lens.

BRIEF DESCRIPTION OF THE DRAWINGS

The above and other objects, features and advantages of the present invention will become more apparent from the following description taken in connection with the accompanying drawings, in which:

FIG. 5 is a perspective view of a lens meter incorporating the refractive characteristics measuring functions of the refractive characteristics measuring apparatus of FIG. 1.

DESCRIPTION OF THE PREFERRED EMBODIMENTS

Figure 1:
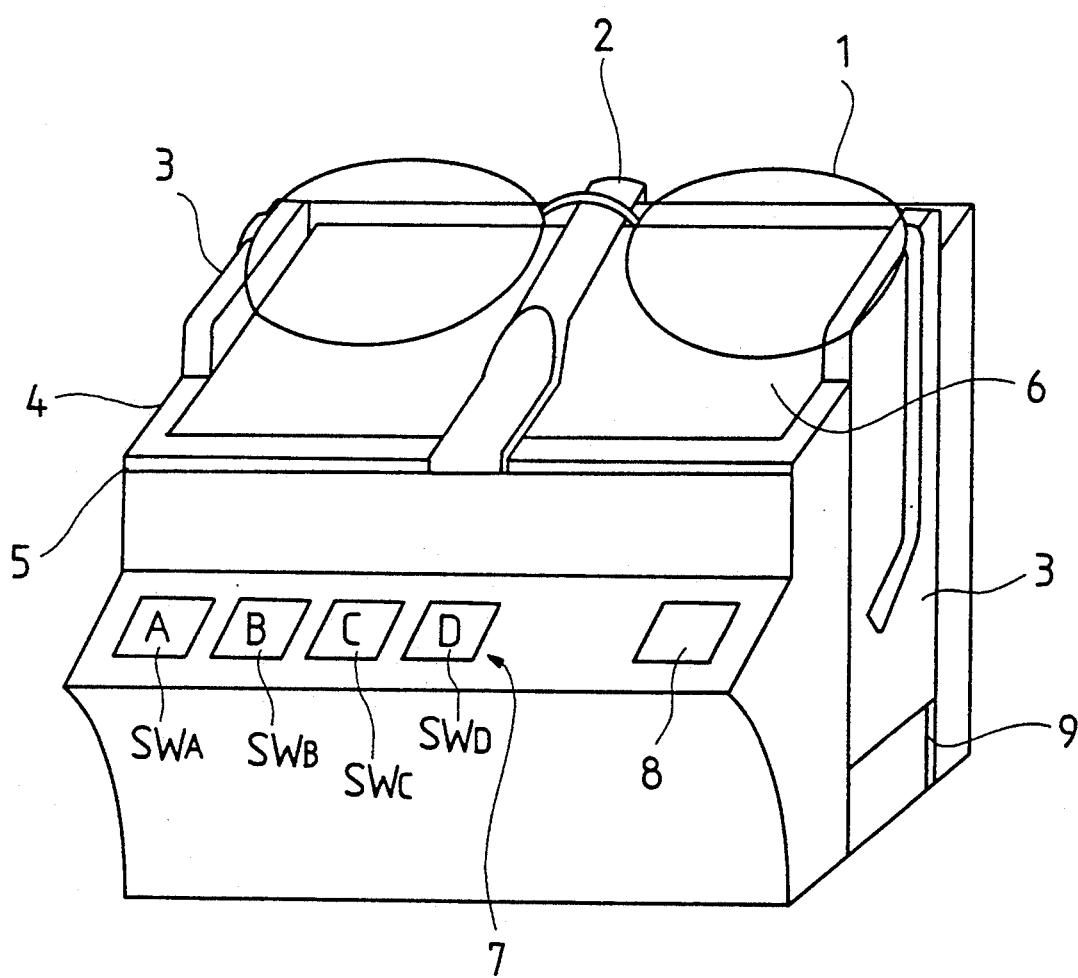
FIG. 1 is a perspective view of a refractive characteristics measuring apparatus for measuring the refractive characteristics of a lens, in a preferred embodiment according to the present invention.

Referring to FIG. 1 showing a refractive characteristics measuring apparatus in a preferred embodiment according to the present invention, a pair of glasses 1 holding a pair of lenses to be tested in rims is supported on a central support 2 resembling the nose, and a pair of frame supports 3 disposed, respectively, on the opposite sides of the central support 2. The central support 2 is laterally slidable on a console along a guide groove 5, and the frame supports 3 can be vertically moved for height adjustment along guide grooves 9. Although the height of the frame supports 3 need not be adjusted very accurately for normal refractive characteristics measurement, it is desirable to move the frame supports 3 by a motor or the like when changing the size of a geometrical test pattern for the observation of the distribution of refractive power by changing the distance between the lenses and the surface of the screen of a display 6, such as a CRT, for displaying a geometrical test pattern. The display 6 may be any suitable display other than a CRT, such as an electroluminescence (EL) display, a liquid crystal display (LCD) or a plasma display capable of displaying images formed by computer graphics. In view of constructing the refractive characteristics measuring apparatus in a small size and reducing the distortion of a displayed image, a backlight LCD, an EL panel and a plasma display are preferred to the CRT.

Different geometrical test patterns will be described later with reference to FIG. 2.

A switching unit 7 is operated when displaying a geometrical test pattern on the display 6. The switching unit is provided with push buttons A, B, C and D for operating switches SWA, SWB, SWC and SWD, and a push button 8 for operating a main switch.

Figure 2:
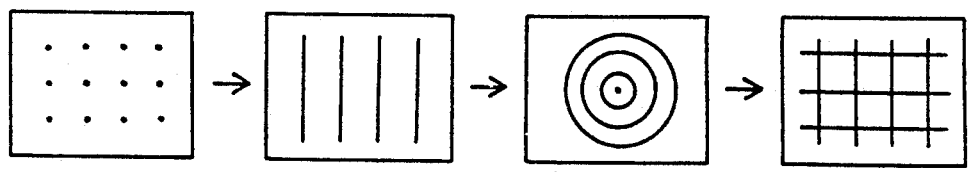
FIGS. 2(a), 2(b) and 2(c) are pictorial views of assistance in explaining the respective functions of switches A, B, C and D.
Figure 2:
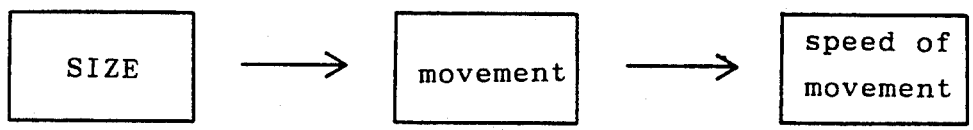
Figure 2:
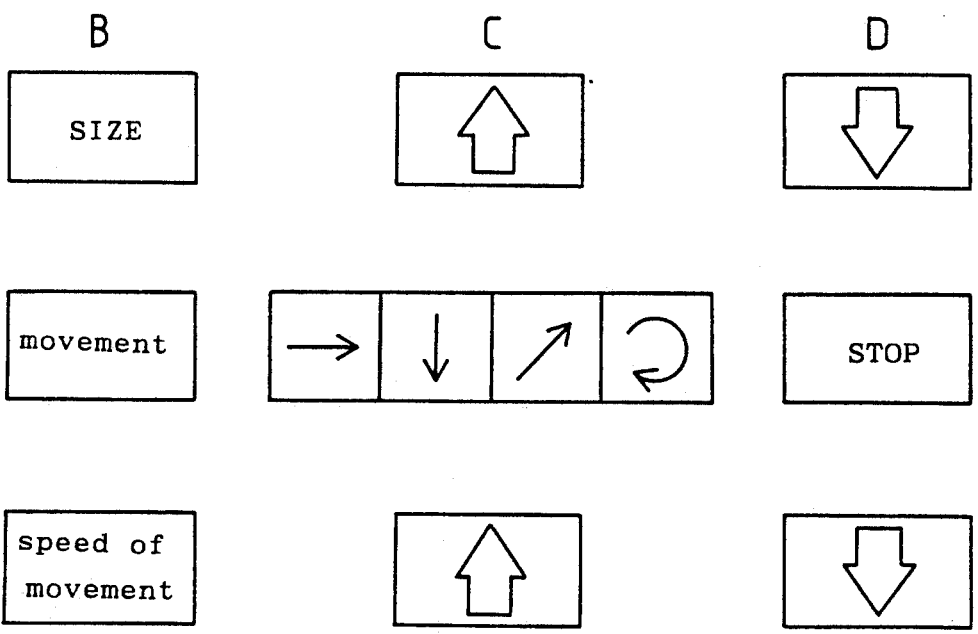

Referring to FIG. 2, the push button A is operated to select a geometrical test pattern among four kinds of geometrical test patterns, i.e., a pattern of a grid, a pattern of dots, a pattern of parallel straight lines and a pattern of concentric circles, to be displayed on the display 6 for the observation of the distribution of refractive power of the lenses 1. The four kinds of geometrical test patterns are selected sequentially as shown in FIG. 2(a) by repeatedly depressing the push button A.

The push button B is operated to select an operating mode among three operating modes, i.e., a pattern modifying mode in which the size and the arrangement of components of the selected geometrical test pattern can be changed, a pattern moving mode in which the selected geometrical test pattern can be moved in a desired direction, and a speed selection mode in which the speed of movement of the selected geometrical test pattern can be changed. These operating modes are selected sequentially as shown in FIG. 2(b) by repeatedly depressing the push button B.

The push buttons C and D are operated to change the size of the selected geometrical test pattern, to select a geometrical test pattern moving method or the like according to the operating mode selected by depressing the push button B as shown in FIG. 2(c). The selected geometrical test pattern can be moved by vertical translation, horizontal translation, diagonal translation or turning.

The results of operation of the push buttons A, B, C and D are displayed in a lower area of the screen of the display 6.

Figure 3:
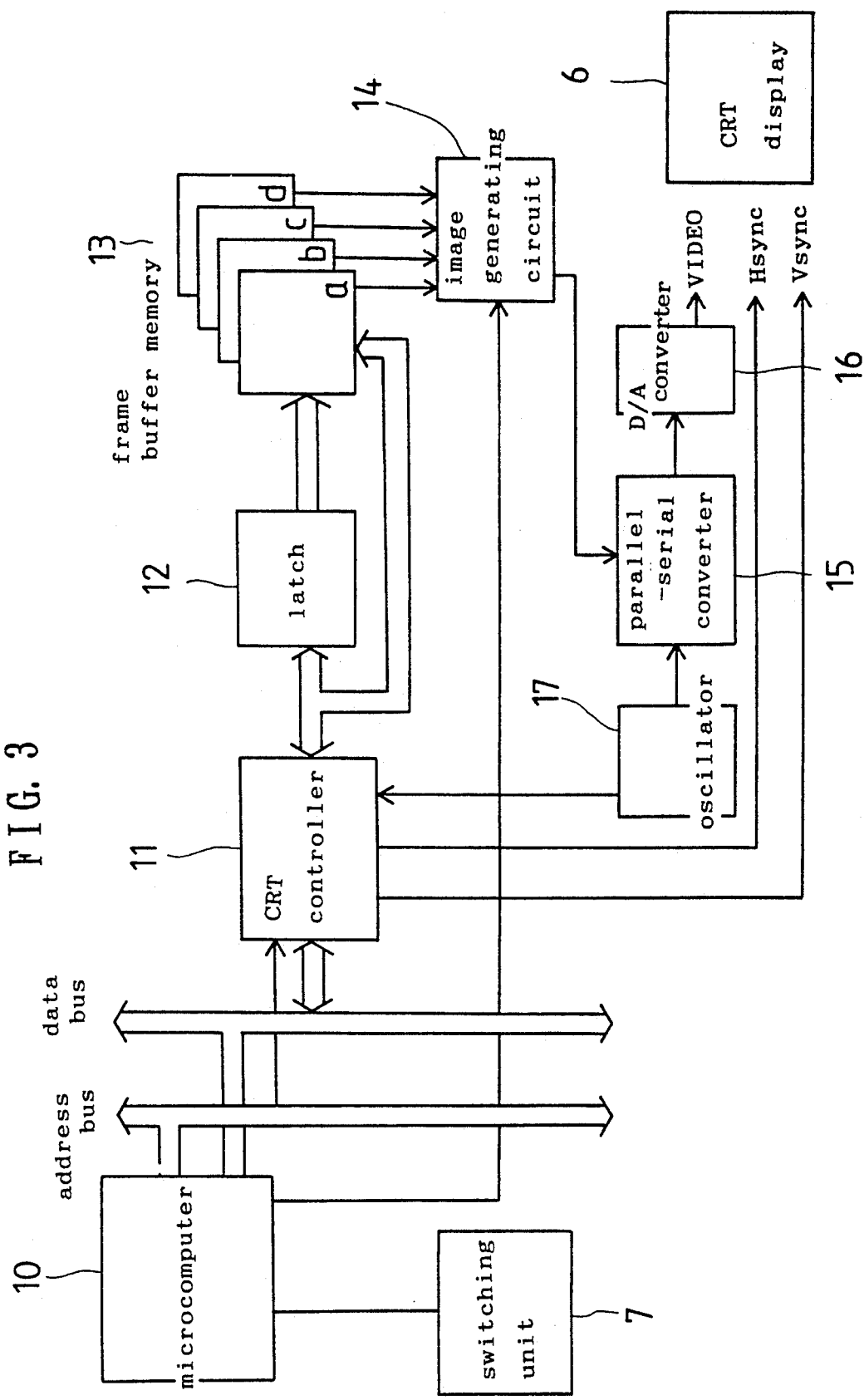
FIG. 3 is a block diagram of an electric system incorporated into the refractive characteristics measuring apparatus of FIG. 1.

An electric system incorporated into the refractive characteristics measuring apparatus will be described hereinafter with reference to FIG. 3.

Selection signals representing selections selected by operating the respective push buttons A, B, C and D of the operating switches SWA, SWB, SWC and SWD are processed and the processed selection signals are given to a microcomputer 10. Then, the microcomputer 10 instructs a display controller 11 to send plotting information to the four frames a, b, c and d of a frame buffer memory, and to send address information through a latch 12 to the frame buffer memory 13, so that the geometrical test pattern and characters are stored in the frame buffer memory 13. The function information concerning the functions of the switches SWA, SWB, SWC and SWD is written in the frame a and the contents of the frame a are displayed in a lower area of the screen of the display 6. Information for carrying out animating functions for the translation or turning of the geometrical test pattern is written in the frames b and c. The selected geometrical test pattern is written in the frame b by the display controller 11 and the geometrical test pattern is displayed. Meanwhile, a geometrical test pattern formed by slightly shifting the frame b is written in the frame c, and then, the frame c is displayed after the completion of displaying the frame b. Thus, the frames b and c are displayed alternately and, consequently, the geometrical test pattern looks as if the same is moved continuously.

The frame buffer memory 13 may be provided with a single frame if the ability of the display controller 11 permits.

The information written in the frames is transferred from the frame buffer memory 13 to an image generating circuit 14 to generate an image. Image signals of a parallel data representation representing the generated image are converted into those of a serial data representation by a parallel-serial converter 15, the image signals are converted into analog video signals by a D/A converter 16, and then, the analog video signals are synchronized by a horizontal synchronizing signal and a vertical synchronizing signal to display a picture represented by the video signals on the display 6. A clock signal generated by an oscillator 17 is given to the display controller 11 and the parallel-serial converter 15 to synchronize the information processing operation of the display controller 11 and the parallel-serial converter 15.

The use of the geometrical test pattern on the refractive characteristics measuring apparatus thus constructed will be described hereinafter.

Figure 4:
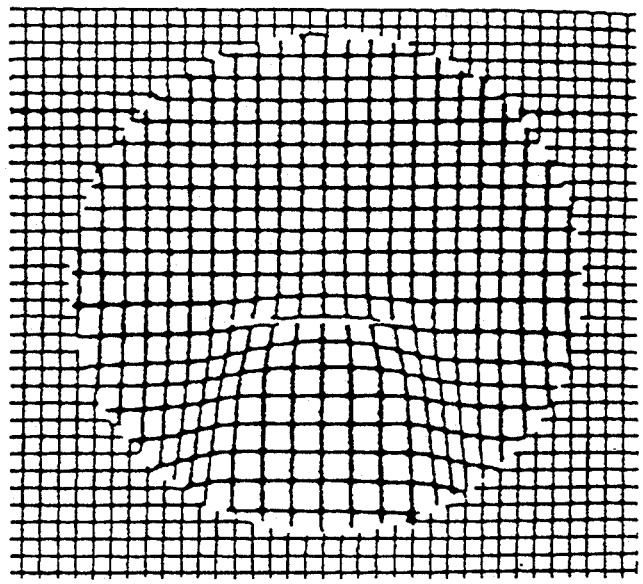
FIG. 4 is a diagram of a test pattern observed through a lens.

When the geometrical test pattern is observed through a progressive multifocal lens, the progressive section, the general disposition of the far viewing section and the near viewing section and the general distribution of refractive power can be recognized from the mode of distortion of the geometrical test pattern as shown in FIG. 4. However, the effect of the geometrical test pattern on showing the distortion caused by a lens is dependent on intervals between the component lines of the geometrical test pattern, and only a single geometrical test pattern is unable to serve properly for the measurement of refractive characteristics of all kinds of lenses of different refractive powers. Furthermore, the distribution of refractive power can be more readily recognized when the geometrical test pattern is moved because the geometrical test pattern passes under the entire area of the lens when the geometrical test pattern is moved.

The characteristic method of using each pattern will be described hereinafter.

Pattern of a Grid

The pattern of a grid may be moved by vertical translation, horizontal translation, diagonal translation or turning. When the pattern of a grid is translated vertically, the vertical lines looks stationary and the horizontal distribution of refractive power can be recognized from the distortion of the horizontal lines, and vice versa when the pattern of a grid is translated horizontally.

The distribution of refractive power can be more readily recognized when the pattern of a grid is translated diagonally or turned because both the vertical and horizontal lines are distorted simultaneously when the pattern of a grid is translated diagonally or turned.

Pattern of Dots

The pattern of dots are regarded as an arrangement of the intersection points of the pattern of a grid. When the pattern of dots are observed through a lens for astigmatic correction or a progressive multifocal lens for astigmatic correction, deformed dots of different sizes can be seen, which intensifies difference in brightness and irregular arrangement of the dots.

Pattern of Parallel Lines

Pattern of parallel lines are formed by omitting either the vertical lines or the horizontal lines of the pattern of a grid. Accordingly, the pattern of parallel lines is effective, when turned, on the determination of the direction of an axis of a lens for astigmatic correction or a progressive multifocal lens for astigmatic correction. It is desirable to indicate the angle of turning of the pattern of parallel lines at a corner of the screen of the display 6.

A cross target consisting of a plurality of perpendicularly intersecting straight lines, which is used on manual lens meters, is a modification of the pattern of parallel lines. The direction of an axis can be exactly determined from the densities of the straight lines by turning a cross target consisting of a plurality of intersecting straight lines of the same line width.

Pattern of Concentric Circles

When a pattern of concentric circles is aligned with the optical center of a lens for astigmatic correction or the center of the far viewing section of a progressive multifocal lens, the distribution of refractive power of the lens can be known from the dislocation of the circles according to the distribution of refractive power.

In operation, the push button 8 of the main switch is operated to connect the refractive characteristics measuring apparatus to a power source. In this initial state, the pattern of a grid is displayed on the display 6. A pair of glasses is set on the frame supports 3 in a horizontal position. The height of the pair of glasses is adjusted by moving the frame supports 3 so as to facilitate the distribution of refractive power. The push button A is operated to select a desired geometrical test pattern, the push button B is operated to determine intervals between the lines of the geometrical test pattern, and the push buttons C and D are operated to select intervals that will cause large distortion and facilitate observation. When it is desired to move the geometrical test pattern, the pattern moving mode is selected by operating the push button B and a direction of movement is selected by operating the push button C. Then, the geometrical test pattern starts moving. The push button D is operated to stop the moving geometrical test pattern. A moving speed is selected by operating the push button B. The moving speed can be changed by operating the push buttons C and D.

Then, the respective positions of the far viewing section and the near viewing section of the progressive multifocal lens through the observation of the distribution of refractive power of the lens and the positions of the far viewing section and the near viewing section are indicated with marks. When the lens is a lens for astigmatic correction, the direction of axis is indicated with a mark. If a cross target is used, the angle of the axis can be known.

FIG. 5 shows an automatic lens meter incorporating the refractive characteristics measuring functions of the refractive characteristics measuring apparatus of FIG. 1. The description of the measurement of the refractive power of a lens by the automatic lens meter will be omitted because the same is not closely related with the present invention. The to "Automatic Lens Meter" proposed in Japanese Patent Laid-open (Kokai) No. Sho 60-17335 by the applicant of the present patent application, sets out typical details of the optical system and algorithm for the lens refractive power measuring apparatus 22 of FIG. 5.

Referring to FIG. 5, the automatic lens meter has a lens table 20 and a display 21. A target mark for use in aligning the optical center of a lens with the optical axis of the measuring system and an alignment mark are displayed on display 21. Apparatus 22 includes measuring light beam projector 23 and apparatus 24, which is an optical detector and refractive power calculator. In the operation, apparatus 22 functions as follows. Measurement light is projected onto glasses 1 (FIG. 1) by measuring light beam projector 23; and the measurement light passed through the glasses 1 is detected by optical detector and refractive power calculator 24. Refractive power is then calculated on the basis of a signal corresponding to the detected measurement light.

In each respective case where, for example, the glasses 1 have (1) only spherical refractive power, (2) only cylindrical refractive power, or (3) both spherical refractive power and cylindrical refractive power, each applicable one of the respective powers and certain other optical properties is calculated by a designated operating formula on the basis of each position of an optical image indicated by the signal. selected geometrical test pattern for the observation of the distribution of refractive power according to the present invention is also displayed on the display 21.

When an observation mode for observing of refractive power is selected by operating switches in a state after the measurement of the far point of the lens by apparatus 22, which can be easily achieved even if the lens is held by a rim, the size of the geometrical test pattern and intervals of the lines of the geometrical test pattern can be automatically selected. The size of the geometrical test pattern and intervals of the lines of the geometrical test pattern are selected with reference to the refractive power of the far point because additive diopter varies in a relatively narrow range. A geometrical test patten optimal for observing the distribution of refractive power is selected according to a program on the basis of the measured refractive power from a table showing refractive powers, and sizes and intervals of lines of geometrical test patterns. Since the geometrical test pattern is enlarged by a convex lens, a geometrical test pattern consisting of lines arranged at intervals smaller than the standard intervals is preferable for testing a convex lens. A geometrical test pattern consisting of lines arranged at smaller interval is used for a convex lens having a larger diopter and vice versa in measuring the refractive characteristics of a concave lens.

The observation mode for observing the distribution of refractive power may be selected automatically subsequent to the operation of a switch for storing the diopter of the far point when a progressive multifocal lens measuring mode is selected.

Since a suitable geometrical test pattern among a plurality of geometrical test patterns including a pattern of a grid, a pattern of dots, a pattern of parallel lines and a pattern of concentric circles is selected by operating the pattern selector switch, the geometrical test pattern is moved by translation or turning and the distribution of refractive power is observed from the geometrical test pattern displayed on the display, the position of the near viewing section of a progressive multifocal lens and the distribution of refractive power in the progressive multifocal lens can be readily determined without requiring much time and the direction of axis of a lens for astigmatic correction and a progressive multifocal lens for astigmatic correction can be easily determined. Thus, the present invention enables the selection of new progressive multifocal lenses having, in addition to a suitable additive diopter, a distribution of refractive power similar to that of the old progressive multifocal lenses of a pair of glasses presently worn by the person and facilitating the adaptation of the person's eyes, when changing the progressive multifocal lenses of the pair of glasses presently worn by the person.

What is claimed is:

1. A refractive characteristics measuring apparatus for measuring the refractive characteristics of a lens through the observation of the distribution of refractive power in a lens, said apparatus comprising:
   selector switches including a pattern selector switch to be operated for selecting a geometrical test pattern to be used for the observation of the distribution of refractive power, among a plurality of geometrical test patterns;
   a pattern generating means for generating data representing a geometrical test pattern selected by operating the pattern selector switch and storing the same in a memory;
   a display means for displaying the selected geometrical test pattern represented by the data generated by the pattern generating means; and
   a support means for supporting the lens between the display means and an examiner for the observation of the distribution of refractive power in the lens.

2. A refractive characteristics measuring apparatus according to claim 1, wherein said selector switches include a selector switch for changing the size and intervals of lines of the selected geometrical test pattern.

3. A refractive characteristics measuring apparatus according to claim 1, wherein said selector switches include a pattern moving switch for translating the selected geometrical test pattern in an optional direction or turning the same through an optional angle.

4. A refractive characteristics measuring apparatus according to claim 3, wherein said selector switches include a moving speed selector switch.

5. A refractive characteristics measuring apparatus comprising:
   a refractive power measuring means for determining the refractive power of a lens by projecting a measuring light bean on the lens, detecting the light beam transmitted through the lens to yield a signal and calculating the refractive power on the basis of the signal;
   selector switches including a pattern selector switch to be operated for selecting a desired geometrical test pattern to be displayed from among a plurality of geometrical test patterns;
   a pattern generating means responsive to the pattern selector switch and to the refractive power measuring means for generating data representing a selected geometrical test pattern that is adjusted for the determined refractive power of the lens; and
   a display means for displaying the geometrical test pattern represented by the data generated by the pattern generating means.

6. A refractive characteristics measuring apparatus according to claim 5, wherein said display means serves also as a display for aligning the optical center of a lens to be tested with the axis of the measuring light beam.

7. A refractive characteristics measuring apparatus according to claim 5, wherein said refractive power measuring means is provided with an automatic pattern modifying means for automatically determining the size and intervals of lines of the selected geometrical test pattern on the basis of measured data.

8. A method of the measuring refractive characteristics of a lens, said method comprising steps of;
   selecting a geometrical test pattern among a plurality of geometrical test patterns for the observation of distribution of refractive power;
   generating the selected geometrical test pattern and storing data representing the selected geometrical test pattern in a memory;
   displaying the generated geometrical test pattern on a display means; and
   observing the geometrical test pattern displayed on the display means through the lens.

* * * * *